United States Patent [19]

Massos et al.

[11] Patent Number: 4,721,326
[45] Date of Patent: Jan. 26, 1988

[54] SUSPENSION JOINT

[75] Inventors: Peter Massos, Clawson; Philip C. Boggs, Jr., Rochester, both of Mich.

[73] Assignee: General Motors Corporation, Detroit, Mich.

[21] Appl. No.: 8,852

[22] Filed: Jan. 30, 1987

[51] Int. Cl.⁴ ............................................. F16B 13/06
[52] U.S. Cl. ................................... 280/673; 267/279; 411/60
[58] Field of Search ................. 280/673, 96.1; 411/22, 411/44, 45, 60, 63; 403/224, 371; 267/57.1 R, 63 R, 57.1 A

[56] References Cited

U.S. PATENT DOCUMENTS

| | | | |
|---|---|---|---|
| 2,900,182 | 8/1959 | Hinks | 267/57.1 R |
| 4,048,898 | 9/1977 | Salter | 411/44 |
| 4,376,604 | 3/1983 | Pratt et al. | 411/44 |
| 4,474,515 | 10/1984 | Pitzer | 411/60 |

FOREIGN PATENT DOCUMENTS

| | | | |
|---|---|---|---|
| 3334250 | 4/1985 | Fed. Rep. of Germany | |
| 195410 | 11/1984 | Japan | 267/57.1 R |

*Primary Examiner*—John J. Love
*Assistant Examiner*—Ross Weaver
*Attorney, Agent, or Firm*—Patrick M. Griffin

[57] ABSTRACT

A suspension bushing joint, rather than clamping the inner sleeve of the bushing directly between spaced walls on a support bracket, clamps the bushing sleeve between one wall of the bracket and an expandable sleeve anchored to the other bracket wall. The expandable sleeve extends through an initially oversized circular opening in the other bracket wall and is anchored thereto by being expanded outwardly by a conical expander portion of a bolt. No forces are generated that would tend to deform the walls toward one another.

3 Claims, 4 Drawing Figures

SUSPENSION JOINT

This invention relates to vehicle suspensions in general, and specifically to an improved suspension bushing joint that avoids deforming the walls of a bracket between which the bushing is fastened.

BACKGROUND OF THE INVENTION

Vehicle suspensions generally have various components, such as upper or lower control arms, that are fastened to support brakets by bushing joints. The typical bushing consists of inner and outer cylindrical metal sleeves with an intermediate rubber layer, with one end of the control arm, or some other suspension member, fixed to the outer sleeve. The typical support bracket consists of two spaced walls that are rigid to the vehicle frame or body with opposed circular openings in the walls small enough that the bushing inner sleeve cannot pass therethrough. The conventional bushing joint is formed by inserting the inner bushing sleeve between the bracket walls, aligned with the openings, and passing a threaded bolt therethrough. Then, a nut is tightened down against the outside of one of the bracket walls until the bolt head is drawn up tight against the outside of the other bracket wall. The inner bushing sleeve is thereby clamped between the inside surfaces of the walls to complete the joint. A drawback of such a joint is that the bushing inner sleeve is ideally made somewhat shorter than the nominal spacing between the bracket walls to assure easy insertion therebetween, and tolerance variations may in fact increase that differential. Therefore, as the clamping load is applied, the walls may tend to deform toward each other before the inside surfaces of the bracket walls are stopped by the ends of the bushing inner sleeve. the bracket walls must, therefore, be made thicker and stronger than they would otherwise have to be to absorb the clamping load deformation without weakening significantly. By the same token, the tolerance in the bushing sleeve-braket wall spacing differential has to be held more closely held than it otherwise would.

An attempt to solve some of the above problems may be seen in the German Offenlegungsschrift DE No. 33434250 A1. There, a pair of relatively thick, rigid spaced walls of a cast iron suspension component have a bushing sleeve clamped therebetween. One of the walls has an opening therethrough that, rather than being straight, tapers toward the opening in the other rigid wall. The bushing sleeve is deliberately made shorter than the spacing between the walls. A radially compressible split sleeve has a tapered outer surface that fits tightly within the tapered wall opening and a cylindrical inner surface that surrounds the bolt near the bolt head. The inside edge of the split sleeve is axially spaced from the end of the bushing sleeve before the nut is tightened down, so that the bolt head drage the split sleeve farther inside the tapered opening, radially compressing it untill it stops on the bushing sleeve. Further tightening of the nut draws the bolt head tight up against the split sleeve, instead of against the outside surface of the wall.

The joint so described above has drawbacks of its own, however, that make it inapplicable to the environment of spaced sheet metal walls. It must be assured that the surface of the tapered split sleeve will be radially tight against the surface of the tapered hole at whatever point that the split sleeve is stopped by the bushing sleeve, in order for the completed joint to be rattle free. To guarantee that, the split sleeve in its initial, uncompressed state must be larger than the tapered opening so as to be radially compressed continuously as it is pulled into the tapered hole. As a consequence, the surface of the tapered sleeve is dragged past the surface of the tapered wall opening continuously as the nut is tightened. This obviously creates a frictional force that would tend to deform the walls toward one another, a force that could be quite strong if the material of the tapered sleeve were resistant to compression. Such a force could easily deform relatively thinner, less rigid sheet metal bracket walls toward one another. Furthermore, the tapered sleeve could present a tolerance problem. The inner, cylindrical surface of the tapered sleeve closes up as the tapered sleeve is compressed. If the tapered sleever were to close on the bolt shaft before it had abutted the bushing sleeve, the tapered sleeve could not be compressed any further or move any farther into the tapered opening, and the joing could not be completed. Therefore, the inside diameter of the tapered sleeve would have to be held closely enough to assure that it did not close prematurely on the bolt shaft. In addition, the use of a tapered opening presupposes a relatively thick wall. The edge of an opening through a relatively thinner, sheet metal wall could not provide any significant taper. Tapered sleeves and tapered openings are more difficult to machine than straight, cylindrical sleeves and openings, as well.

SUMMARY OF THE INVENTION

The invention provides an improved suspension joint that does not present the problems discussed above. The invention is disclosed in the environment of a vehicle suspension lower control arm, one end of which includes a bushing that has an inner cylindrical sleeve. A support bracket to which the lower control arm bushing is to be fastened has first and second generally parallel sheet metal bracket walls that are spaced apart a distance that is greater than the length of the bushing sleeve. The improved joint of the invention clamps the bushing sleeve between the walls without deforming the bracket walls toward one another.

The improved joint of the invention includes a radially expandable cylindrical sleeve that cooperates with a pair of specifically sized openings in the bracket walls and with a specially designed threaded bolt. The expandable sleeve is formed from a harder metal than the bracket walls, and is axially split. The expandable sleeve's diameter, both in its expanded and its unexpanded state, is such that is abuttable with the bushing sleeve. When abutted, the expandable sleeve and the bushing sleeve have a total length that is slightly greater than the spacing between the bracket walls plus the thickness of the bracket first wall. The bracket first wall has a straight sided circular opening therethrough with a diameter that is greater than the unexpanded outside diameter of the expandable sleeve. The bracket second wall has a smaller circular opening therethrough opposed to the opening in the bracket first wall and sufficiently small that the bushing sleeve cannot pass therethrough.

The bolt has a head larger than the diameter of the bracket first wall hole and a cylindrical threaded shaft sufficiently narrow to be fitted through the expandable sleeve except for an expander portion. The expander portion of the bolt has a conical lead that tapers from the shaft to a cylindrical plug adjacent the bolt head.

The greatest diameter of the expander portion is the point where the conical lead merges with the cylindrical plug. That greatest diameter, if forced inside of the expandable sleeve, is large enough to radially expand the outer diameter of the expandable sleeve to match or slightly exceed the diameter of the circular opening through the bracket first wall.

The bushing sleeve is fastened between the bracket walls by placing the expandable sleeve over the bolt shaft and inserting the bolt shaft through the bracket first wall opening, the bushing sleeve and the bracket second wall opening. The threaded end of the bolt extends through the bracket second wall opening, and the expandable sleeve extends axially through the bracket first wall opening with radial clearance. Next, a nut is threaded to the shaft and tightened so that the bolt expander portion pulls the expandable sleeve, without expanding it, into abutment with bushing sleeve, and then pulls both sleeves together axially toward the bracket second wall. The sleeves more without resistance, because of the radial clearance between the expandable sleeve and the bracket first wall opening.

No expansion of the expandable sleeve occurs until the bushing sleeve and abutted expandable sleeve are axially stopped by hitting the inside of the bracket second wall. Further tightening of the nut draws the conical lead axially within the expandable sleeve to expand it radially outwardly until the outside thereof is forced radially into the edge of the bracket first wall opening. The outside of the expandable sleeve is forced into the edge of the bracket first wall opening tightly enough to anchor it relative to the bracket wall, or even tightly enough to yield the metal around the bracket first wall opening to become essentially a part of the first wall. After the expandable sleeve has been so anchored, further tightening of the nut draws the cyindrical plug into the now expanded sleeve, but no forces are generated to deform the bracket first wall toward the second. Finally, the bolt head engages the expandable sleeve. Further tightening of the nut will now force the expandable sleeve and bushing sleeve more tightly together, effectively clamping the bushing sleeve between the bracket second wall and the now anchored expandable sleeve to complete the joint. The application of even a large clamping load will not deform the bracket walls toward one another, as in a conventional joint.

It is, therefore, a general object of the invention to provide a joint between a suspension support bracket and a suspension member sleeved bushing without deforming the bracket.

It is another object of the invention to provide such a joint in which an expandable sleeve and a bolt with an expander portion cooperate with a pair of specifically sized holes in spaced first and second walls of the bracket so as to anchor the expandable sleeve relative to the bracket first wall bracket and so as to clamp the bushing sleeve in place without deforming the bracket walls toward one another.

It is yet another object of the invention to provide such a joint in which the expandable sleeve initially fits through the bracket first wall opening with radial clearance, and in which the bolt has a conical expander portion that initially pulls both sleeves together axially toward the bracket second wall without resistance, by virtue of the radial clearance, until both sleeves are axially stopped by the bracket second wall, with further tightening of the bolt acting to draw the expander portion axially within the expandable sleeve to expand it radially outwardly and anchor it to the second bracket wall, with further bolt tightening then clamping the bushing sleeve between the anchored expandable sleeve and second bracket wall to form a complete joint without deforming the bracket walls toward one another.

DESCRIPTION OF THE PREFERRED EMBODIMENT

These and other objects and features of the invention will appear from the following written description and the drawings, in which.

Figure 1:
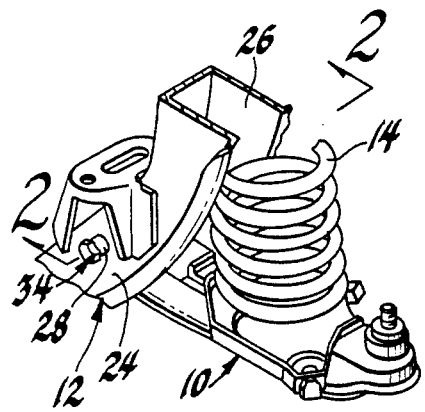
FIG. 1 is a view of a portion of a vehicle suspension incorporating the completed joint of the invention.
Figure 2:
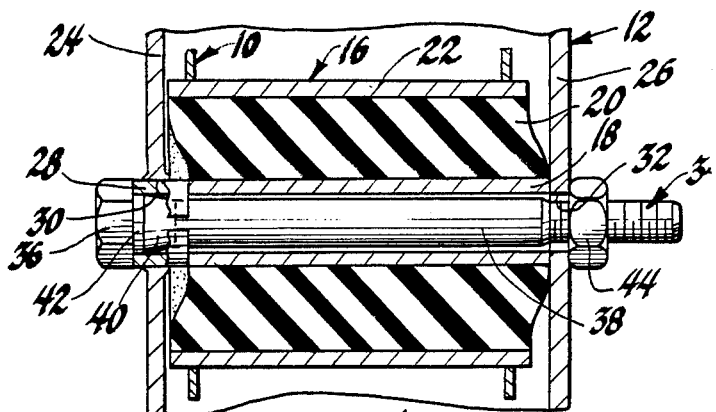
FIG. 2 is a sectional view taken along the line 2—2 of FIG. 1.

Referring first to FIGS. 1 and 2, a portion of a vehicle suspension is shown, including a lower control arm designated generally at 10, a support bracket designated generally at 12, and a coil spring 14. Support bracket 12 forms part of the vehicle body in a vehicle with a unit body frame, although it could be part of or mounted to a separate frame in another vehicle. A suspension member other than a control arm could be involved, as well, although a control arm is typical. A bushing, designated generally at 16, includes an inner metal cylinder sleeve 18, a rubber isolator 20, and an outer metal casing 22 to which the end of the control 10 is welded. Bracket 12 includes first and second generally parallel sheet metal walls 24 and 26 respectively that are spaced apart a distance that is greater than the length of the bushing sleeve 18. The sheet metal of walls 24 and 26 is yieldable and less resistant to bending than thicker, more rigid metals, such as cast iron. The invention provides an improved suspension joint that fastens bushing 16 between the walls 24 and 26 without deforming them toward one another, as a conventional joint may.

Figure 3:
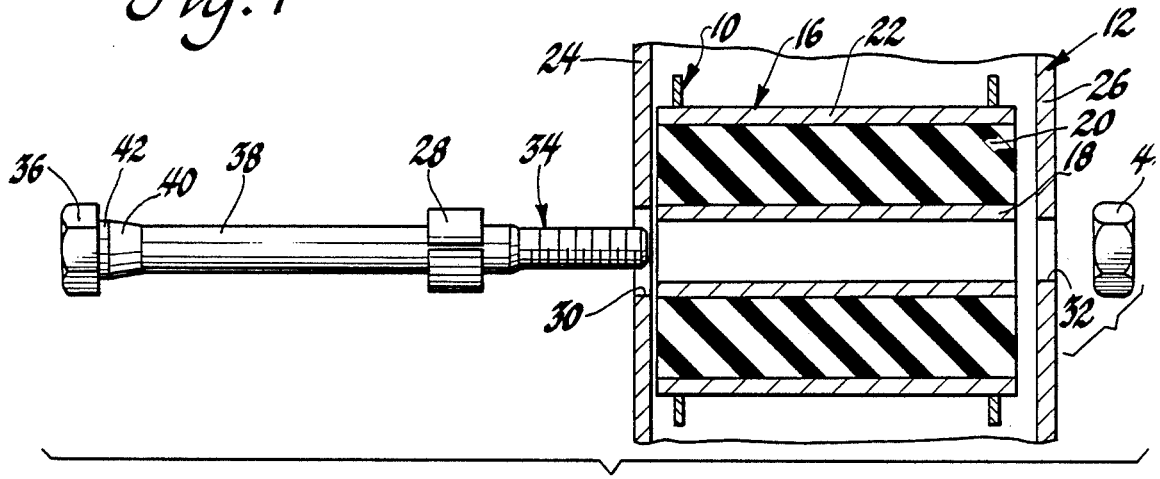
FIG. 3 is a view similar to FIG. 2, but disassembled.

Referring next to FIG. 3, the joint of the invention includes a radially expandable cylindrical sheet metal sleeve 28 that cooperates with a pair of specifically sized opposed openings 30 and 32 in the bracket first and second walls 24 and 26 respectively, and a specially designed threaded bolt designated generally at 34. The expandable sleeve 28 is formed from a harder metal, such as case hardened steel, than are the bracket walls 24 and 26, and is axially split. The expandable sleeve 28 remains abuttable with the bushing sleeve 18 at all times. Stated more specifically, the outside diameter of expandable sleeve 28, in its unexpanded state, is greater than the inside diameter of bushing sleeve 18, while its inside diameter in its expanded state is less than the outside diameter of bushing sleeve 18. This assures that the right hand end of expandable sleeve 28 will always be engageable with the left hand end of bushing sleeve 18. The length of expandable sleeve 28 is such that, when abutted with bushing sleeve 18, the two have a total length that is slightly greater than the spacing between the bracket walls 24 and 26 plus the thickness of the bracket first wall 24, for a purpose described below.

Still referring to FIG. 3, the opening 30 has a straight sided edge with a diameter that is greater than the unexpanded outside diameter of the expandable sleeve 28. There is an upper limit on the diameter of opening 30, as well. Since the outside diameter of sleeve 28, when expanded, will match the diameter of opening 30, and since sleeve 28 must remain always abuttable with bushing sleeve 18, opening 30 must be no larger in diameter than the outside diameter of bushing sleeve 18 plus twice the thickness of sleeve 28. That assures that bushing sleeve 18 cannot slip inside of expandable sleeve 28 in its expanded state. As a practical matter, making the diameter of opening 30 about the same as the outside diameter of bushing sleeve 18, as shown, works well. The smaller opening 32 must be sufficiently small so that the bushing sleeve 18 cannot pass therethrough, but not so small that bolt 34 cannot pass therethrough. As a practical matter, making opening 32 about equal to the inside diameter of bushing sleeve 18 works well.

Still referring to FIG. 3, bolt 34 has a head 36 that is larger than the diameter of opening 30 and a cylindrical threaded shaft sufficiently narrow to be fitted through the expandable sleve 28, except for an expander portion. The expander portion, in the embodiment disclosed, includes a conical lead 40 that tapers from the shaft 36 to a cylindrical plug 42 adjacent the bolt head 38. The largest diameter of conical lead 40, the point where it merges with the cylindrical plug 42, is approximately equal to, or slightly larger than, an amount equal to the diameter of opening 30 less twice the wall thickness of expandable sleeve 28. Stated more generally, conical lead 40 is large enough, if forced inside of the expandable sleeve 28, to radially expand its outside diameter to match, or slightly exceed, the diameter of opening 30.

Figure 4:
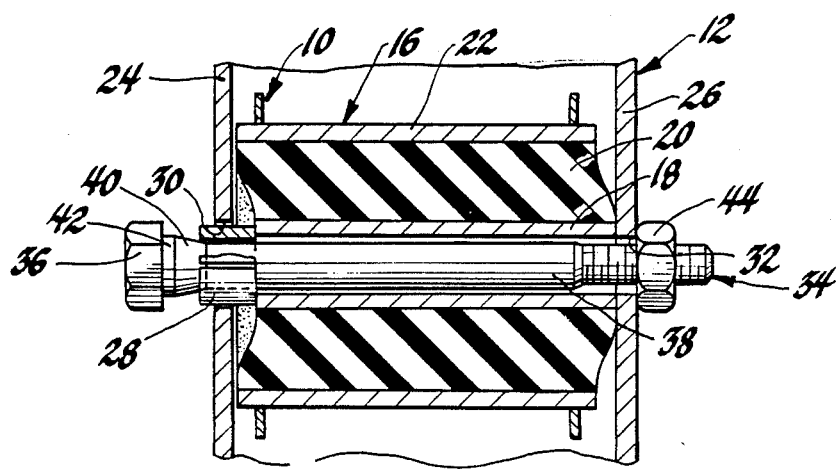
FIG. 4 is a view similar to FIG. 2, at an intermediate point in assembling the joint.

Referring next to FIGS. 3 and 2, the bushing 16 is fastened to the bracket 12 by first placing it between the bracket walls 24 and 26 with the inner sleeve 18 aligned with openings 30 and 32. As shown, bushing 16 is displaced to the left, near the inside surface of first bracket wall 24. Tolerance considerations make this possible, although bushing 16 could be closer to the other bracket wall 26, or even exactly centered. Bushing 16 must be narrow enough to easily fit between the walls 24 and 26, and there is nothing to determine exactly where it will fall therebetween. The case shown, however, illustrates the operation well. Next, the expandable sleeve 28 is slipped over the bolt shaft 38 and inserted through the opening 30. Bolt shaft 38 extends on through bushing sleeve 18 and out opening 32. Expandable sleeve 28 extends axially out of the opening 30, but, importantly, has a significant radial clearance from the edge thereof. Next, a nut 44 is threaded to the shaft 38 and turned down. Alternatively, bolt shaft 38 could be directly threaded into a smaller opening 32. Tightening nut 44 initially pulls the conical lead 40 slightly inside the expandable sleeve 28, without expanding it, and then pulls sleeve 28 into abutment with bushing sleeve 18. Further tightening then pulls both sleeves 18 and 28 together to the right toward the bracket second wall 26. The sleeves 28 and 18 move without significant frictional resistance, because of the radial clearance described. As bushing sleeve 18 is pulled to the right, the rubber isolator 20 is bulged to the right. Eventually, the rightward movement stops as bushing sleeve 18 engages the inside surface of wall 26, as shown in FIG. 4. No expansion of the expandable sleeve 28 has yet occurred in the FIG. 4 position.

Referring next to FIG. 2, once the bushing sleeve 18 has been stopped by the bracket second wall 26, further tightening of the nut 44 draws the conical lead 40 within the expandable sleeve 28 to expand it radially outwardly until the outside thereof is forced radially into the edge of opening 30. While there is frictional drag at this point between the inside of the expandable sleeve 28 and the conical lead 40, none of that drag acts to deform the bracket first wall 24 toward the second wall 26, because the expandable sleeve 28 is now axially stationary relative to the opening 30. At the point where the conical lead 40 has been drawn completely within the expandable sleeve 28, the outside thereof is forced radially outwardly into the edge of the opening 30 tightly enough to anchor sleeve 28 relative to the bracket first wall 24. In the embodiment disclosed, where the conical lead 40 is large enough to expand the expandable sleeve 28 until its outer diameter is slightly greater than the diameter of opening 30, then the metal of wall 24 around the edge of opening 30 is acutally slightly yielded, as shown. This serves to fix the now expanded sleeve 28 to the bracket first wall 24, which, in effect, becomes a part of the wall 24, as if welded thereto.

Still referring to FIG. 4, after the expandable sleeve 28 has been so anchored, further tightening of the nut 44 draws the cylindrical plug 42 within the now anchored sleeve 28. Since sleeve 28 is anchored to first wall 24 and axially stopped by bushing sleeve 18, any frictional force generated by sliding plug 42 through the inside of sleeve 28 does not act to deform first wall 24 toward second wall 26. Finally, the bolt head 36 engages the left hand end of the expandable sleeve 28, and is held away from the outside of bracket first wall 24 by the left hand end of expandable sleeve 28. Plug 42 allows the largest diameter of the conical lead 40 to move a little farther inboard, assuring that the proper portion of sleeve 28 gets expanded, within and into the opening 30, and also helps to radially support the bolt shaft 38 within the sleeve 28. Further tightening of the nut 44 then clamps the bushing sleeve 18 between the anchored expandable sleeve 28 and the second wall 26 to complete the joint, as opposed to conventionally clamping the bushing sleeve 18 directly between the walls 24 and 26. Since the bolt head 36 is held away from the outside of the bracket first wall 24 by the expandable sleeve 28, a large clamping load can be applied without deforming the bracket walls 24 and 26 toward one another. This allows walls 24 and 26 to be made thinner than in a conventional joint, because their strength is not used up in resisting deformation caused by the clamping load. Conversely, walls 24 and 26 may be made as thick as desired without compromising the clamp load, because the clamping is now independent of any deformation of walls 24 and 26. That is, unlike the conventional case, it is not necessary to deform walls 24 and 26 toward one another in order to create a clamping force. Also, the tolerance in the differential between the length of sleeve 18 and the spacing of walls 24 and 26 need not be held as tightly as in a conventional joint, because that differential will not lead to deformation.

Variations of the preferred embodiment disclosed may be made within the spirit of the invention. The expander portion of bolt 34 need not necessarily have the cylindrical plug 42. Instead, the largest diameter of the conical lead 40 could be coincident with the bolt head 36. However, the plug 42 does allow the largest diameter of the conical lead 40 to move farther inboard of sleeve 28, therefore allowing the expandable sleeve 28 to extend out of the opening 30 a greater amount, while still assuring that the proper part of the sleeve 28 gets expanded. This means that the relation of the spacing of the walls 24 and 26 to the total length of sleeves 28 and 18 would not have to be held as tight to assure that the left end of sleeve 28 will still hold the bolt head 26 away from the outside of the bracket wall 24. As already mentioned, the nut 44 could be eliminated in favor of a bolt threaded directly into opening 32, in which case the bolt would be directly tightened, instead of turning the nut 44. Furthermore, the use of a relatively harder material for sleeve 28 and the greater diameter of conical lead 40 so as to yield the material around the edge of opening 30 is not strictly necessary. However, a very strong anchoring is thereby achieved, and it is then unnecessary to hold the diameter of opening 30 quite as tightly. Should opening 30 be slightly larger than is specified, sleeve 28 would still be forced into it tightly enough to be anchored, even if the material around opening 30 were not yielded. Therefore, it will be understood that the invention is not intended to be limited to just the preferred embodiment disclosed.

The embodiments of the invention in which an exclusive property or privilege is claimed are defined as follows:

1. In a vehicle having a suspension support bracket and a suspension member with a bushing that has a sleeve, an improved joint for fastening said bushing to said bracket without deforming said bracket, comprising, first and second generally parallel bracket walls spaced apart a distance that is greater than the length of said bushing sleeve, a radially expandable cylindrical sleeve that is abuttable with said bushing sleeve, said abutted expandable and bushing sleeves having a total length that is slightly greater than the spacing between said bracket walls plus the thickness of said bracket first wall, said bracket first wall further having a circular opening therethrough with a diameter greater than the unexpanded outside diameter of said expandable sleeve, said bracket second wall further having an opening therethrough opposed to the opening in said bracket first wall and sufficiently small that said bushing sleeve cannot pass therethrough, and, a bolt having a head larger than the diameter of said bracket first wall opening and a threaded shaft sufficiently narrow to be fitted through said expandable sleeve except for a conical expander portion that tapers from said shaft to a greatest diameter at said head, said greatest diameter being just sufficient to radially expand the outside of said expandable sleeve to the diameter of said bracket first wall opening, whereby said bushing sleeve may be fastened between said bracket walls by placing said expandable sleeve over said bolt shaft and inserting said bolt shaft through said bushing sleeve and bracket wall openings with said expandable sleeve extending axially through said bracket first wall opening with radial clearance and then tightening said bolt so that said bolt expander portion pulls said expandable sleeve into abutment with said bushing sleeve and then pulls both sleeves together axially toward said bracket second wall without resistance until said bushing sleeve and abutted expander sleeve are axially stopped by said bracket second wall, further tightening of said bolt acting to draw said expander portion axially within said expandable sleeve to expand said expandable sleeve radially outwardly until the outside thereof is forced radially into the edge of said bracket first wall opening to anchor said expanded sleeve relative to said bracket first wall and said bolt head engages said expandable sleeve with axial clearance from the outside of said bracket first wall, thereby clamping said bushing sleeve between said anchored expandable sleeve and said second wall to form a complete secure bushing-bracket joint without deforming said bracket walls toward one another.

2. In a vehicle having a suspension support bracket and a suspension member with a bushing that has a sleeve, an improved joint for fastening said bushing to said bracket without deforming said bracket, comprising, first and second generally parallel bracket walls spaced apart a distance that is greater than the length of said bushing sleeve, a radially expandable cylindrical sleeve that is abuttable with said bushing sleeve, said abutted expandable and bushing sleeves having a total length that is slightly greater than the spacing between said bracket walls plus the thickness of said bracket first wall, said bracket first wall further having a circular opening therethrough with a diameter greater than the unexpanded outside diameter of said expandable sleeve, said bracket second wall further having an opening therethrough opposed to the opening in said bracket first wall and sufficiently small that said bushing sleeve cannot pass therethrough, and, a bolt having a head larger than the diameter of said bracket first wall opening and a threaded shaft sufficiently narrow to be fitted through said expandable sleeve except for a conical expander portion that tapers from said shaft to a greatest diameter at said head, said greatest diameter being just sufficient to radially expand the outside of said expandable sleeve to a diameter slightly greater than the diameter of said bracket first wall opening, whereby said bushing sleeve may be fastened between said bracket walls by placing said expandable sleeve over said bolt shaft and inserting said bolt shaft through said bushing sleeve and bracket wall openings with said expandable sleeve extending axially through said bracket first wall opening with radial clearance and then tightening said bolt so that said bolt expander portion pulls said expandable sleeve into abutment with said bushing sleeve and then pulls both sleeves together axially toward said bracket second wall without resistance until said bushing sleeve and abutted expander sleeve are axially stopped by said bracket second wall, further tightening of said bolt acting to draw said expander portion axially within said expandable sleeve to expand said expandable sleeve radially outwardly until the outside thereof slightly yields the material at the edge of said bracket first wall opening to fix said expanded sleeve to said bracket first wall and said bolt head engages said expandable sleeve with axial clearance from the outside of said bracket first wall, thereby clamping said bushing sleeve between said anchored expandable sleeve and said second wall to form a complete bushing-bracket joint without deforming said bracket walls toward one another.

3. In a vehicle having a suspension support bracket and a suspension member with a bushing that has a sleeve, an improved joint for fastening said bushing to said bracket without deforming said bracket, comprising,
- first and second generally parallel bracket walls spaced apart a distance that is greater than the length of said bushing sleeve,
- a radially expandable cylindrical sleeve that is abuttable with said bushing sleeve, said abutted expandable and bushing sleeves having a total length that is slightly greater than the spacing between said bracket walls plus the thickness of said bracket first wall,
- said bracket first wall further having a circular opening therethrough with a diameter greater than the unexpanded outside diameter of said expandable sleeve,
- said bracket second wall further having an opening therethrough opposed to the opening in said bracket first wall and sufficiently small that said bushing sleeve cannot pass therethrough, and,
- a bolt having a head larger than the diameter of said bracket first wall opening and a threaded shaft sufficiently narrow to be fitted through said expandable sleeve except for an expander portion that has a conical lead tapering from said shaft to a cylindrical plug adjacent said bolt head, with the greatest diameter of said expander portion being just sufficient to radially expand the outside of said expandable sleeve to the diameter of said bracket first wall opening, whereby said bushing sleeve may be fastened between said bracket walls by placing said expandable sleeve over said bolt shaft and inserting said bolt shaft through said bushing sleeve and bracket wall openings with said expandable sleeve extending axially through said bracket first wall opening with radial clearance and then tightening said bolt so that said bolt expander portion pulls said expandable sleeve into abutment with said bushing sleeve and then pulls both sleeves together axially toward said bracket second wall without resistance until said bushing sleeve and abutted expander sleeve are axially stopped by said bracket second wall, further tightening of said bolt acting to draw said conical lead axially within said expandable sleeve to expand said expandable sleeve radially outwardly until the outside thereof is forced radially into the edge of said bracket first wall opening to anchor said expanded sleeve relative to said bracket wall, after which said cylindrical plug is drawn within said expandable sleeve while the largest diameter of said conical lead moves farther within said expandable sleeve until said bolt head engages said expandable sleeve with axial clearance from the outside of said bracket first wall, thereby clamping said bushing sleeve between said anchored expandable sleeve and said second wall to complete a bushing-bracket joint without deforming said bracket walls toward one another.

* * * * *